United States Patent [19]

Naish

[11] Patent Number: 4,754,698

[45] Date of Patent: Jul. 5, 1988

[54] HOME BREWING APPARATUS

[76] Inventor: Ralph P. Naish, 1440 Rosehill Drive, North West, Calgary, Alberta, Canada, T2K 1M4

[21] Appl. No.: 936,544

[22] Filed: Dec. 1, 1986

[51] Int. Cl.⁴ .............................................. C12G 1/02
[52] U.S. Cl. ................................................. 99/275
[58] Field of Search ............. 99/275, 276, 348, 277.2, 99/278, 277, 279, 280, 281, 282, 283, 300, 308, 309, 310, 311, 312, 313; 426/11, 15; 134/108, 195

[56] References Cited

U.S. PATENT DOCUMENTS

| 444,152 | 1/1891 | Madlener | 99/277.2 |
| 748,531 | 12/1903 | Roche | 99/277.2 |
| 806,935 | 12/1905 | Engel | 99/277 |
| 4,163,417 | 8/1979 | Wolfseder | 99/277.2 |
| 4,665,807 | 5/1987 | Rieger | 99/277.2 |

Primary Examiner—Robert W. Jenkins
Attorney, Agent, or Firm—George H. Dunsmuir

[57] ABSTRACT

The conventional home brewing apparatus for beer includes a container with some form of heater therein and a bag for suspending grain in the container. A more efficient home brewing apparatus includes a container with a pump for withdrawing liquid from the bottom of the container and re-introducing the liquid into the container at the top thereof, separate heater and heater control elements, a liquid level indicator, a separate cooling coil for removable mounting in the container, and a multi-level grid structure for supporting the grain bag at a location spaced apart from the heater. The circulating of the liquid ensures that the temperature throughout the brewing liquid is uniform, and that there is consistency from batch to batch.

6 Claims, 2 Drawing Sheets

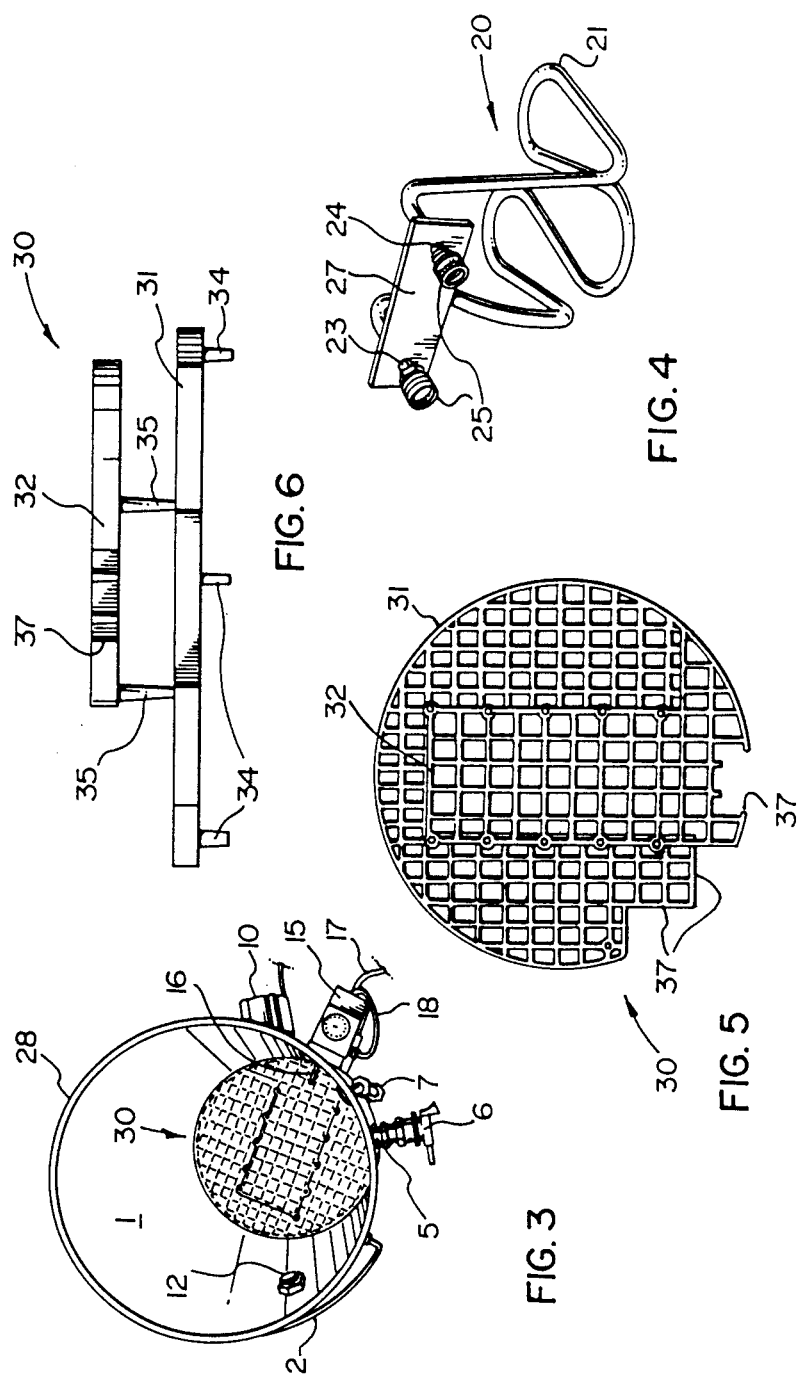

HOME BREWING APPARATUS

BACKGROUND OF THE INVENTION

This invention relates to an apparatus for brewing alcoholic beverages, and in particular to a home brewing apparatus.

There is not a particularly large number of home brewing apparatuses available in the marketplace. By the same token, there are very few patents relating to home brewing apparatuses. Patents disclosing subject matter generally related to the present invention include U.S. Pat. Nos. 748,531, which issued to J. P. Roche on Dec. 29, 1903; 806,935, which issued to W. L. Straus et al on Dec.12, 1905; 4,163,417, which issued to A. Wolfseder on Aug. 7, 1979 and 4,218,964, which issued to L. P. Beadle on Aug. 6, 1980. While these patents disclose elements which can be used in home brewing apparatuses, none of the patents teaches the use of an apparatus which can be used to carry out a complete brewing process efficiently.

The object of the present invention is to provide a relatively simple home brewing apparatus which can be used to perform an entire brewing process in an efficient manner.

BRIEF SUMMARY OF THE INVENTION

Accordingly, the present invention relates to an apparatus for use in the home brewing of alcoholic beverages comprising open topped container means for receiving brewing ingredients; vented cover means for removable mounting on said container means to close the top end thereof; heater means extending into said container means near the bottom thereof; grid means for mounting in said container means above said heater means for supporting granular brewing ingredients, and for maintaining such ingredients separate from the heater means; and circulation means in fluid communication with the upper and lower ends of said container means for circulating liquid from the lower end of said container means to the top end thereof.

BRIEF DESCRIPTION OF THE DRAWINGS

The invention will now be described in greater detail with reference to the accompanying drawings, which illustrate a preferred embodiment of the invention, and wherein:

FIG. 3 is a perspective view from above of the brewing apparatus of FIGS. 1 and 2;

FIG. 4 is a perspective view of a cooling element for use in the apparatus of FIGS. 1 to 3;

FIG. 5 is a plan view of a grid element for use in the apparatus of FIGS. 1 to 3; and FIG. 6 is a side elevation view of the grid element of FIG. 5.

DESCRIPTION OF THE PREFERRED EMBODIMENT

Figure 1:
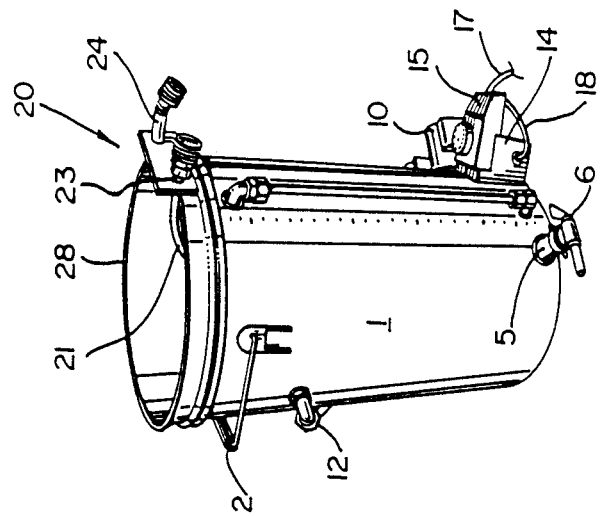
FIG. 1 is a perspective view from one side of a brewing apparatus in accordance with the present invention.

With reference to the drawings, the brewing apparatus of the present invention includes an open top container 1 with, for example a twenty-five litre capacity. The container 1 is manufactured from high density, food grade polyethylene, and includes a handle 2 and a vented cover 3 (FIG. 1). It will be appreciated that the container 1 can also be made of metal, fiberglass or another type of plastic. The vented lid 3 permits the escape of gases, i.e. releases pressure during the brewing process.

The brewing container 1 can be used at temperatures in excess of 100° C.

Liquid is introduced into the container 1 through the top end, and can be discharged through an outlet duct 5 and a manually operable valve spigot 6. A stand pipe 7 is provided on one side of the container 1. The pipe 7 defines a fluid level indicator, and for such purpose the top and bottom ends of the pipe 7 are in fluid communication with the interior of the container 1. The pipe 7 is formed of heat resistant acrylic plastic. During brewing, liquid is removed from the bottom of the container 1 through an outlet duct 9 and a magnetic drive, continuous circulation pump 10. Liquid passing through the pump 10 flows through a nylon inlet tube 12 into the upper end of the container 1. Thus, liquid can continuously be removed from the lower end of the container 1 and returned to the upper end of the container.

The contents of the container are heated by an elongated, generally U-shaped heating element (not shown), which extends into the bottom of the container 1 from a casing 14. The heating element is a 1500 watt unit which is controlled by a separate temperature controller. The temperature controller includes a casing 15 mounted on the side of the container 1 above the heater casing 14 and a probe 16 (FIG. 3) extending into the container 1 above the heater coil. By providing a space between the heater coil and the control probe 15, separate servicing of the elements can be effected. Electrical power is fed to the control 15 via a cable 17. The control 15 is connected to the heater 14 by a cable 18. A thermo-cutout device (not shown) is used in conjunction with the heater coil as a safety device.

Cooling of the contents of the container 1 is effected by means of a separate cooling element generally indicated at 20 (FIG. 4). The cooling element 20 is defined by a sinuous tube 21 with parallel inlet and outlet ends 23 and 24, respectively.

Figure 2:
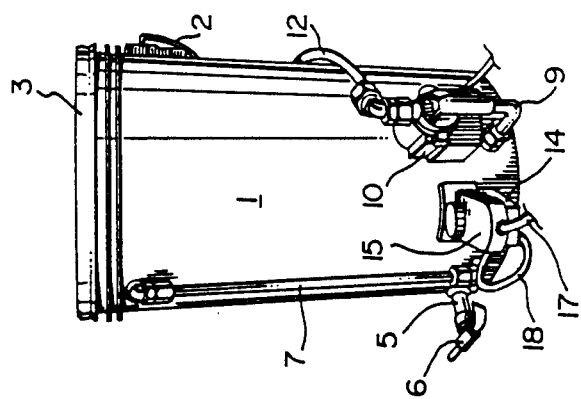
FIG. 2 is a perspective view from above and another side of the brewing apparatus of FIG. 1.

Coupler elements 25 are provided on the ends 23 and 24 of the tube 21 for connecting the tube to a source of cold water and a drain (not shown). The ends 23 and 24 of the tube extend through a rectangular plate 27, so that the cooling element can be suspended from the top edge 28 of the container (FIG. 2).

The granular material (not shown) e.g. grains used in the brewing process are contained in a porous bag, which is placed on a grid element generally indicated at 30 (FIGS. 5 and 6). The grid element 30 is multi-levelled, including a generally circular base 31 and an upper, generally rectangular ledge 32. Feet 34 extend downwardly from the base 31 for supporting the grid element 30 in the container 1. Posts 35 connect the ledge 32 to the base 31, which includes a rectangular opening substantially coextensive with the ledge 32. The coil of the heating element 14 extends into the container 1 between the base 31 and the ledge 32, while, as shown in FIG. 3, the control probe 16 is located above the ledge 32. Indentations 37 are provided in the grid element 30 facilitating the insertion of other elements of the apparatus into the container 1. The grid element, 30 which is formed of plastic prevents contact between the grain and heater element, and consequently prevents burning of the grain.

It will be appreciated that the brewing apparatus of the present invention permits the full brewing process to be carried out in a single container 1. However, it is recommended that fermentation be carried out in a separate container. The apparatus of the present invention can be used for mashing, cooking and cooling. During mashing, grain in the grain bag is placed on the grid element 30, the pump 10 is operated and heating is effected. During sparging water is poured into the grain bag and permitted to drain through the outlet tube 5 and a spigot 6.

The use of the pump 10 for continuous circulation of the liquid in the container 1 ensures maximum use of the material removed from the grain, i.e. efficient use of the grain, and consistency from batch to batch. Because of the stirring action produced by circulating the liquid, sugars do not settle on the heating coil, and consequently the finished product is relatively high quality. Moreover, there is no need for a separate stirrer. The pump used in the apparatus can be disassembled and cleaned between each batch to ensure no residue or bacteria buildup in the pump.

The separate cooling coil 20 can be inserted into the container 1 to effect quick cooling of beer to bring the beer to a fast cold break. A fast cold break means less time for the liquid to become contaminated by wild yeast or other contaminents.

While the apparatus has been described for use in the brewing of beer, it will be appreciated that the apparatus can also be used in wine making.

What I claim is:

1. An apparatus for use in the home brewing of alcoholic beverages comprising:
   (a) open topped container means for receiving brewing ingredients;
   (b) vented cover means for removable mounting on said container means to close the top end thereof;
   (c) heater means extending into said container means near the bottom thereof;
   (d) grid means for mounting in said container means above said heater means for supporting granular brewing ingredients, and for maintaining such ingredients separate from the heater means; and
   (e) circulation means in fluid communication with the upper and lower ends of said container means for circulating liquid from the lower end of said container means to the upper end thereof.
   (f) thermostat means extending into said container means in spaced apart relationship to said heater means for controlling operation of said heater means.

2. An apparatus according to claim 1, wherein said circulation means includes pump means mounted on said container means near the lower end thereof for receiving liquid from the container means; and duct means connecting said pump means to the upper end of said container means.

3. An apparatus according to claim 1, including indicator means on the side of said container means for indicating the level of liquid in the container means.

4. An apparatus according to claim 1, including cooler means for removable mounting in said container means for cooling the contents thereof.

5. An apparatus according to claim 4, wherein said cooler means includes sinuous duct means for circulating water within said container means; and mounting means for mounting the duct means in the top end of the container means.

6. An apparatus according to claim 1, wherein said grid means is multi-levelled; each level including a grid and spaced apart posts extending downwardly therefrom, whereby said heater means can be inserted between the levels of the grid means without contacting solid ingredients on the grid means.

* * * * *